United States Patent
Yasuda et al.

(10) Patent No.: US 8,329,353 B2
(45) Date of Patent: Dec. 11, 2012

(54) FUEL CELL SYSTEM

(75) Inventors: Shigeki Yasuda, Osaka (JP); Takashi Nishikawa, Nara (JP); Hideo Ohara, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 910 days.

(21) Appl. No.: 12/308,046

(22) PCT Filed: Jun. 6, 2007

(86) PCT No.: PCT/JP2007/061488
§ 371 (c)(1),
(2), (4) Date: Dec. 5, 2008

(87) PCT Pub. No.: WO2007/142278
PCT Pub. Date: Dec. 13, 2007

(65) Prior Publication Data
US 2009/0181271 A1 Jul. 16, 2009

(30) Foreign Application Priority Data
Jun. 6, 2006 (JP) .................................. 2006-156947

(51) Int. Cl.
*H01M 8/04* (2006.01)
(52) U.S. Cl. ........ 429/436; 429/428; 429/430; 429/431; 429/432; 429/433; 429/434; 429/441; 429/442
(58) Field of Classification Search ......................... None
See application file for complete search history.

(56) References Cited

U.S. PATENT DOCUMENTS
2003/0211373 A1 11/2003 Ueda et al.

FOREIGN PATENT DOCUMENTS
JP 2002-216824 8/2002
(Continued)

OTHER PUBLICATIONS

Japanese Office Action issued in Japanese Patent Application No. 2008-520611 dated Jul. 31, 2012.

*Primary Examiner* — Cynthia Lee
(74) *Attorney, Agent, or Firm* — McDermott Will & Emery LLP

(57) ABSTRACT

A fuel cell system of the present invention includes a fuel cell (3); a water passage (8, 10, 12, 15, 17, 18); an electric heater (19) configured to heat the water passage; a water-related temperature detector (20); a first abnormality detector (22, etc.) configured to detect first abnormalities; a second abnormality detector (28, etc.) configured to detect second abnormalities; and a controller (21), and the controller is configured to stop an operation of the fuel cell system when the first abnormality is detected by the first abnormality detector or when the second abnormality is detected by the second abnormality detector. In a case where the fuel cell system stops since the second abnormality is detected by the second abnormality detector, the controller causes the electric heater (19) to carry out an operation as an antifreezing operation when the water-related temperature detector detects a temperature that is not more than a predetermined threshold. In a case where the fuel cell system stops since the first abnormality is detected by the first abnormality detector, the controller does not cause the electric heater (19) to carry out the operation as the antifreezing operation even when the water-related temperature detector detects the temperature that is not more than the predetermined threshold.

16 Claims, 5 Drawing Sheets

FOREIGN PATENT DOCUMENTS

| | | |
|---|---|---|
| JP | 2002-352839 A | 12/2002 |
| JP | 2004-006270 | 1/2004 |
| JP | 2004-207093 | 7/2004 |
| JP | 2005-062532 A | 3/2005 |
| JP | 2005-259494 | 9/2005 |
| JP | 2005-327501 | 11/2005 |
| JP | 2007-200679 | 8/2007 |

| LARGE CLASSIFICATION | MIDDLE CLASSIFICATION | SMALL CLASSIFICATION |
|---|---|---|
| FIRST ABNORMALITY | COMBUSTIBLE GAS LEAKAGE ABNORMALITY | COMBUSTIBLE GAS CONCENTRATION ABNORMALITY |
| | | DISCHARGED COMBUSTION GAS CO CONCENTRATION ABNORMALITY |
| | | COMBUSTION FAN ABNORMALITY |
| | | REFORMER TEMPERATURE ABNORMALITY |
| | | REFORMER PRESSURE ABNORMALITY |
| SECOND ABNORMALITY | WATER TEMPERATURE ABNORMALITY | COOLING WATER TEMPERATURE ABNORMALITY |
| | | HOT WATER TEMPERATURE ABNORMALITY |
| | WATER LEVEL ABNORMALITY | RECOVERED WATER TANK WATER LEVEL ABNORMALITY |
| | | COOLING WATER TANK WATER LEVEL ABNORMALITY |
| | FLOW RATE ABNORMALITY | REFORMING WATER SUPPLY ABNORMALITY |
| | | STACK AIR SUPPLY ABNORMALITY |
| | | HOT WATER PUMP ABNORMALITY |
| | | COOLING WATER PUMP ABNORMALITY |
| | | OXIDATION GAS FLOW RATE ABNORMALITY |
| | ELECTRIC POWER OUTPUT ABNORMALITY | STACK VOLTAGE DROP ABNORMALITY |
| | | INVERTER ABNORMALITY |
| | FLOW RATE CONTROLLER ABNORMALITY | NO EXAMPLES ARE SHOWN |

Fig. 3

FUEL CELL SYSTEM

RELATED APPLICATIONS

This application is the US National Phase under 35 U.S.C. §371 of International Application No. PCT/JP2007/061488 filed on Jun. 6, 2007, which claims the benefit of Japanese Application Nos. JP 2006-156947, filed on Jun. 6, 2006, the disclosures of which Applications are incorporated by reference herein.

TECHNICAL FIELD

The present invention relates to a fuel cell system, and particularly to a mechanism which prevents water from freezing and secures safety when an abnormality has occurred.

BACKGROUND ART

A fuel cell system includes a fuel cell which generates electric power by a chemical reaction between hydrogen and oxygen, and a cooling water passage which cools down the fuel cell. In a case where such fuel cell system is left outdoors for a certain period of time or more without operating it, the water in the cooling water passage freezes with decrease in an outside air temperature. As a result, when starting up the fuel cell system next time, it may be impossible to control the temperature of the fuel cell, so that the electric power generation may not be carried out or the efficiency of the electric power generation may deteriorate. Moreover, the fuel cell may be mechanically damaged by the freezing, so that the fuel cell system may not be operated even after unfreezing, or the power generation efficiency may deteriorate. In addition, components, such as a pump, a tank, and a pipe, which cause cooling water to circulate, may be mechanically damaged. As a result, an adequate amount of water may not circulate to cool down the fuel cell, so that the power consumption may increase, the power generation efficiency may deteriorate, or the fuel cell system may not be operated. Further, the water leaking from a damaged portion may cause an electric leakage, and this may cause a risky situation in light of safety.

Known as one example of the fuel cell system which can prevent the freezing is a fuel cell system which includes a temperature sensor which detects an outside temperature and carries out an antifreezing operation when the temperature sensor detects a threshold temperature or lower (see Patent Document 1 for example).

Hereinafter, details of such fuel cell system will be explained. FIG. 5 is a diagram showing a schematic configuration of a conventional fuel cell system described in Patent Document 1.

The fuel cell system described in Patent Document 1 includes: a fuel cell 135; a water supplying line 136 which supplies water to the fuel cell 135; a water processing device 138 which processes city water 137 into pure water; a pressurization pump 139 which feeds the pure water processed in the water processing device 138 to the water supplying line 136; a heater 140 disposed at the water processing device 138; a temperature sensor 141; and a controller 142. The water supplying line 136 includes a water tank 143 and a pressurization pump 144 which supplies water to the fuel cell 135.

When the temperature sensor 141 detects a predetermined temperature or lower, the controller 142 causes the pressurization pump 139 and the pressurization pump 144 to supply the water as antifreezing processing. In addition, the controller 142 turns on a switch of the heater 140 to cause the heater 140 to heat the water processing device 138. With this, even when the outside air temperature is low, it is possible to prevent the freezing of the water supplying line 136 which supplies the water to the fuel cell system, and prevent the damage of the fuel cell system.

Patent Document 1: Japanese Laid-Open Patent Application Publication 2004-207093

DISCLOSURE OF THE INVENTION

Problems to be Solved by the Invention

In a case where some kind of abnormality occurs in the above-described conventional fuel cell system, it is preferable to stop all the operations of the fuel cell system to secure safety. However, in a case where the outside air temperature decreases to freeze the water in the fuel cell system while the fuel cell system is stopping, the fuel cell system may be damaged.

The present invention was made in view of these problems, and an object of the present invention is to provide a fuel cell system capable of preventing water from freezing while securing safety.

Means for Solving the Problems

The present inventors have diligently studied to solve the above problems. To be specific, a case is assumed where the outside air temperature lowers to a predetermined temperature or lower while a fuel cell system having an antifreezing operation function is stopping since some kind of abnormality has occurred in the fuel cell system. In this case, if the heater is activated, without exception, to carry out the antifreezing operation for placing priority on preventing the freezing, fire or the like may break out by the switch of the heater as an ignition source in a case where the abnormality is, for example, leakage of a combustible gas in the fuel cell system. On the other hand, in a case where the abnormality does not disturb the safety of the fuel cell system even if the heater is activated, it is preferable to activate the heater since the water in the fuel cell system is prevented from freezing. Thus, the present inventors have found that whether or not to carry out the antifreezing operation is determined based on the type of the abnormality. Specifically, the present inventors have found that whether or not the abnormality is such an abnormality that the safety of the fuel cell system is disturbed by activating the heater is determined, and when the abnormality is such an abnormality that the safety of the fuel cell system is disturbed by activating the heater, the antifreezing operation is not carried out to place priority on the safety, and when the abnormality is such an abnormality that the safety of the fuel cell system is not disturbed by activating the heater, the antifreezing operation is carried out to place priority on preventing the freezing.

To be specific, a fuel cell system according to the present invention includes: a fuel cell configured to generate electric power using fuel and an oxidizing agent; a water passage which is a passage of water related to an operation of the fuel cell; an electric heater configured to heat the water passage; a water-related temperature detector configured to detect a temperature related to a temperature of the water in the water passage; a first abnormality detector configured to detect first abnormalities including abnormalities related to leakage of a combustible gas; a second abnormality detector configured to detect second abnormalities different from the first abnormalities; and a controller, the controller being configured to stop an operation of the fuel cell system when the first abnormality is detected by the first abnormality detector or when the second abnormality is detected by the second abnormality detector, wherein: the controller is configured to cause the electric heater to carry out an operation as an antifreezing operation when the water-related temperature detector detects a temperature that is not more than a predetermined threshold in a case where the fuel cell system stops since the second abnormality is detected by the second abnormality detector; and the controller is configured not to cause the electric heater to carry out the operation as the antifreezing operation even when the water-related temperature detector detects the temperature that is not more than the predetermined threshold in a case where the fuel cell system stops since the first abnormality is detected by the first abnormality detector.

In accordance with this configuration, in a case where the fuel cell system stops since the first abnormality related to the leakage of the combustible gas has occurred in the fuel cell system, a further hazardous event, such as fire, may occur by causing the electric heater to carry out the operation as the antifreezing operation. Therefore, by stopping the antifreezing operation, it is possible to secure the safety. Moreover, in a case where the fuel cell system stops since the second abnormality different from the first abnormality has occurred, the electric heater is operated as freezing preventing means based on the detected temperature detected by the temperature detector, thereby preventing the water passage from freezing. As a result, the damage of the fuel cell system due to the freezing of the water passage is prevented.

The water passage may be at least one of a cooling water passage through which cooling water used to cool down the fuel cell flows, a cooling water tank configured to store the cooling water, a hot water passage through which hot water used to recover heat from the cooling water flowing through the cooling water passage flows, a hot water tank configured to store the hot water, a recovered water passage through which recovered water recovered from an exhaust gas discharged from the fuel cell flows, and a recovered water tank configured to store the recovered water.

The fuel cell system may include as the first abnormality detector a combustible gas sensor configured to detect a concentration of the combustible gas, wherein the controller may be configured not to cause the electric heater to carry out the operation as the antifreezing operation even when the water-related temperature detector detects the temperature that is not more than the predetermined threshold in a case where the fuel cell system stops since the concentration of the combustible gas detected by the combustible gas sensor is not less than a predetermined threshold.

The fuel cell system may further include: a reformer configured to generate a hydrogen-containing gas as the fuel from a raw material; a burner configured to heat the reformer; and a CO sensor as the first abnormality detector configured to detect a concentration of CO in the exhaust gas discharged from the burner, wherein the controller may be configured not to cause the electric heater to carry out the operation as the antifreezing operation even when the water-related temperature detector detects the temperature that is not more than the predetermined threshold in a case where the fuel cell system stops since the concentration of the CO detected by the CO sensor is not less than a predetermined threshold.

The fuel cell system may further include: an oxidation gas supplying unit configured to supply an oxidation gas to a burner; and an oxidation gas supply abnormality detector as the first abnormality detector configured to detect the abnormality of the oxidation gas supplying unit, wherein the controller may be configured not to cause the electric heater to carry out the operation as the antifreezing operation even when the water-related temperature detector detects the temperature that is not more than the predetermined threshold in a case where the fuel cell system stops since the oxidation gas supply abnormality detector detects the abnormality.

The fuel cell system may further include: a reformer configured to generate a hydrogen-containing gas as the fuel from a raw material; and a reformer temperature detector as the first abnormality detector configured to detect a temperature of the reformer, wherein the controller may be configured not to cause the electric heater to carry out the operation as the antifreezing operation even when the water-related temperature detector detects the temperature that is not more than the predetermined threshold in a case where the fuel cell system stops since the reformer temperature detector detects a temperature that is not less than a predetermined threshold.

The fuel cell system may further include: a reformer configured to generate a hydrogen-containing gas as the fuel from a raw material; and a pressure detector as the first abnormality detector configured to detect pressure inside the reformer, wherein the controller may be configured not to cause the electric heater to carry out the operation as the antifreezing operation even when the water-related temperature detector detects the temperature that is not more than the predetermined threshold in a case where the fuel cell system stops since the pressure detector detects pressure that is not less than a predetermined threshold.

The second abnormality detector may detect as the second abnormality at least one of: an abnormality of a flow rate controller (except for a combustion air supplying unit) configured to control a flow rate of water or air related to the operation of the fuel cell system; an abnormality regarding a temperature of the water related to the operation of the fuel cell; an abnormality regarding a water level of the water related to the operation of the fuel cell; an abnormality regarding a flow rate of a fluid (except for combustion air) related to the operation of the fuel cell; and an abnormality regarding an output of the electric power generated by the fuel cell, and the controller may be configured to cause the electric heater to carry out the operation as the antifreezing operation when the water-related temperature detector detects the temperature that is not more than the predetermined threshold in a case where the fuel cell system stops since the second abnormality is detected by the second abnormality detector.

The fuel cell system may further include: a cooling water pump configured to cause the cooling water to flow; and a cooling water pump abnormality detector as the second abnormality detector configured to detect an abnormality of the cooling water pump as the abnormality regarding the flow rate of the fluid related to the operation of the fuel cell.

The above object, other objects, features and advantages of the present invention will be made clear by the following detailed explanation of preferred embodiments with reference to the attached drawings.

Effects of the Invention

The present invention is configured as above, and has an effect of being capable of preventing the water from freezing in the fuel cell system while securing the safety.

BRIEF DESCRIPTION OF THE DRAWINGS

FIG. 3 is a table showing a classification of abnormalities in the present invention.

Figure 1:
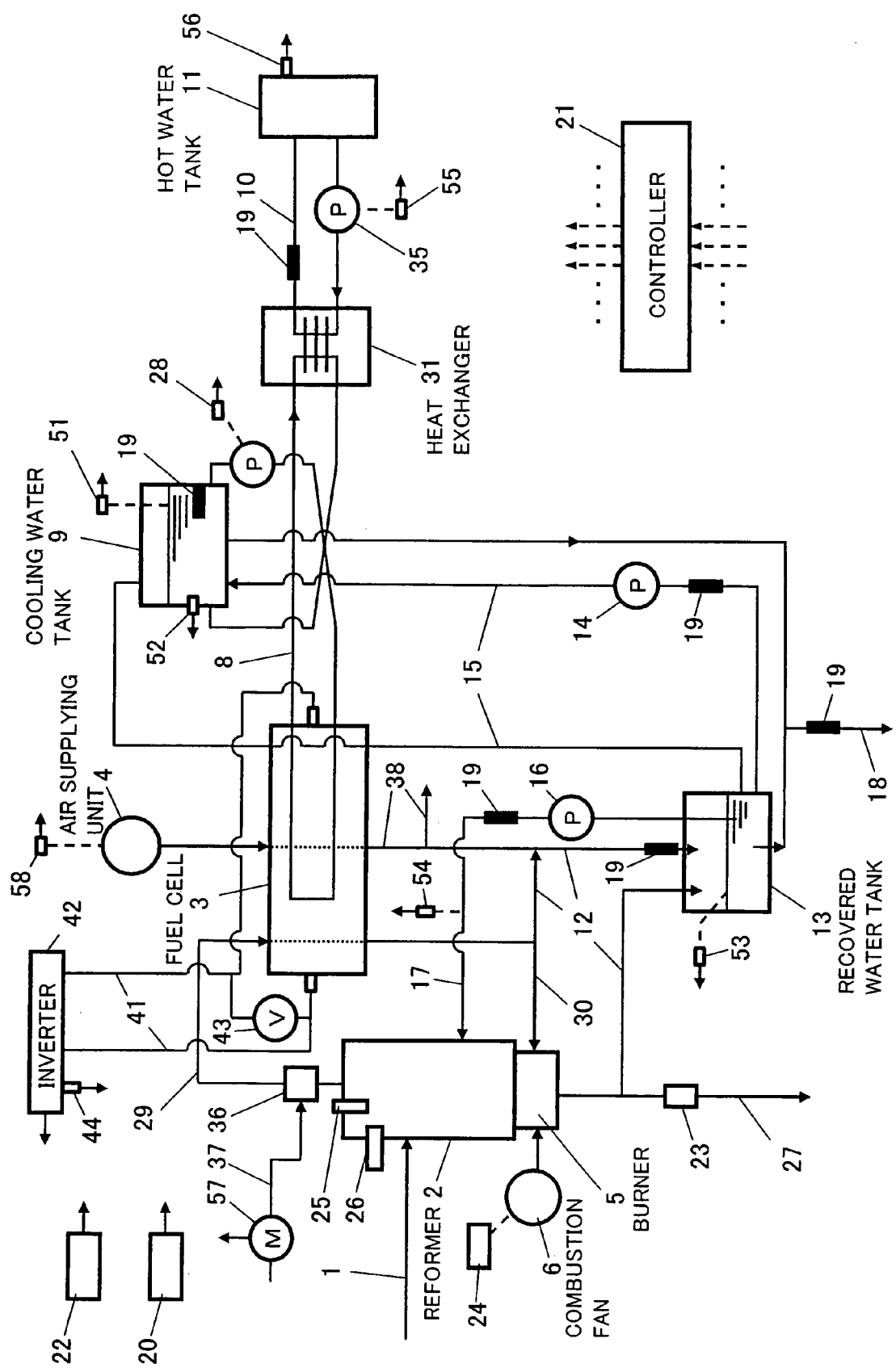
FIG. 1 is a block diagram showing the configuration of a fuel cell power generating system according to an embodiment of the present invention.

EXPLANATION OF REFERENCE NUMBERS 1 raw material supplying passage
2 reformer
3 fuel cell
4 air supplying unit
5 burner
6 combustion fan
7 cooling water pump
8 cooling water passage
9 cooling water tank
10 hot water passage
11 hot water tank
12 recovered water passage
13 recovered water tank
14 mutual circulating pump
15 mutual circulating passage
16 reforming water pump
17 reforming water passage
18 discharged water passage
19 electric heater
20 temperature detector
21 controller
22 combustible gas sensor
23 CO sensor
24 combustion fan abnormality detector
25 reformer temperature detector
26 pressure detector
27 discharged combustion gas passage
28 cooling water pump abnormality detector
29 hydrogen supplying passage
30 discharged hydrogen gas passage
31 heat exchanger
32 power supply
32 on-off switch
34 antifreezing stop switch
35 hot water pump
36 CO remover
37 oxidation gas passage
38 discharged air passage
39 antifreezing circuit
41 electric wire
42 inverter
43 stack voltage drop abnormality detector
44 inverter abnormality detector
51 cooling water level detector
52 cooling water temperature detector
53 recovered water level detector
54 reforming water supply abnormality detector
55 hot water pump abnormality detector
56 hot water temperature detector
57 oxidation gas flow rate abnormality detector
58 stack air supply abnormality detector

BEST MODE FOR CARRYING OUT THE INVENTION

Hereinafter, a preferred embodiment of the present invention will be explained in reference to the drawings.

Embodiment

FIG. 1 is a block diagram showing the configuration of a fuel cell power generating system according to the embodiment of the present invention.

First, a hardware configuration will be explained.

A fuel cell system of the present embodiment includes a reformer 2 which generates a hydrogen-containing gas by a steam-reforming reaction between a raw material supplied from a raw material supplying passage 1 and steam. A CO remover 36 oxidizes carbon monoxide (hereinafter referred to as "CO"), which is contained in the hydrogen-containing gas generated by the reformer 2, by using air as an oxidation gas supplied from an oxidation gas passage 37, thereby reducing the concentration of the CO in the hydrogen-containing gas. The hydrogen-containing gas which is reduced in the concentration of the CO is supplied from the CO remover 36 through a hydrogen supplying passage 20 to a fuel cell 3. The fuel cell 3 generates electric power by a chemical reaction between the hydrogen-containing gas as fuel and the air as an oxidizing agent. The air is supplied from an air supplying unit 4 to the fuel cell 3. Herein, the air supplying unit 4 is constituted by a blower. The hydrogen-containing gas unused in the reaction in the fuel cell 3 is supplied as a discharged hydrogen gas through a discharged hydrogen gas passage 30 to a burner 5. The burner 5 combusts the discharged hydrogen gas or the raw material, supplied through a passage which is not shown, by the air supplied from a combustion fan 6, and heats the reformer 2 by this combustion heat. The heat by this heating is used in the reformer 2 to reform the raw material into the hydrogen-containing gas. The combustion gas generated in the burner 5 is discharged through a discharged combustion gas passage 27 to outside.

Moreover, the air unused in the reaction in the fuel cell 3 is discharged as discharged air through a discharged air passage 38 to outside. A condenser, not shown, is disposed at the discharged air passage 38, and the water in the discharged air condensed by the condenser flows through a recovered water passage 12 to a recovered water tank 13 and is stored in the recovered water tank 13. Also, a condenser, not shown, is disposed at each of the discharged hydrogen gas passage 30 and the discharged combustion gas passage 27, and the water in the discharged air and the water in the discharged combustion gas which are condensed by the corresponding condensers flow through the recovered water passage 12 to the recovered water tank 13 and are stored in the recovered water tank 13. The water stored in the recovered water tank 13 is supplied through a reforming water passage 17 to the reformer 2 by a pump 16, and is used in the reformer 2 for the reforming from the raw material to the hydrogen-containing gas. The water in the recovered water tank 13 is discharged through a discharged water passage 18 by opening a drain valve, not shown.

Moreover, the fuel cell system includes a cooling water passage 8 formed by a circulating passage running through the fuel cell 3. A cooling water tank 9, a cooling water pump 7 which causes the cooling water to circulate through the cooling water passage 8, and a heat exchanger 31 are disposed at the cooling water passage 8. The heat exchanger 31 is disposed over the cooling water passage 8 and a hot water passage 10, and carries out heat exchange between the cooling water flowing through the cooling water passage 8 and the hot water flowing through the hot water passage 10. A hot water tank 11 which stores the hot water and a hot water pump 9 which causes the hot water to flow through the hot water passage are disposed at the hot water passage 10. With this, the cooling water discharged from the cooling water tank 9 flows through the fuel cell 3, and recovers exhaust heat from the fuel cell 3 while flowing through the fuel cell 3, with the result that the cooling water increases in temperature. Then, the cooling water which is increased in temperature transfers the exhaust heat to the hot water in the heat exchanger 31 to be cooled down, and then returns to the cooling water tank 9. The hot water to which the exhaust heat is transferred increases in temperature, and is stored in the hot water tank. As a result, the fuel cell 3 is cooled down by the cooling water, and the exhaust heat recovered from the fuel cell 3 is stored in the hot water tank as the high-temperature hot water and utilized by a user for hot water supply and the like. Moreover, a mutual circulating passage 15 including a pump 14 is formed to extend between the cooling water tank 9 and the recovered water tank 13. The water stored in the recovered water tank 13 is supplied to the cooling water tank 9 by the pump 14, and the water overflowing from the cooling water tank 9 returns to the recovered water tank 13. The water collecting in the cooling water tank 9 is used therein as the cooling water. A purifier including an ion exchanger, not shown, is disposed at a portion of an outward route, extending toward the cooling water tank 9, of the mutual circulating passage 15. With this configuration, the cooling water which is deteriorated by circulating in the cooling water passage 8 is purified. The water in the cooling water tank 9 is discharged through the discharged water passage 18 by opening a drain valve, not shown.

In the fuel cell system, electric heaters 19 are disposed at water passages which may freeze. In the present embodiment, the electric heaters 19 are disposed at the cooling water passage 8, the hot water passage 10, the recovered water passage 12, the mutual circulating passage 15, the reforming water passage 17, and the discharged water passage 18, respectively, each of which is one example of the water passage of the present invention. As in the present embodiment, the electric heater 19 may be directly disposed on the passage. However, the electric heater 19 may be disposed at a position away from the passage and indirectly heat the passage by radiation heat. Moreover, the water passages at each of which the electric heater 19 is disposed are not limited to the above passages. For example, the electric heater 19 may be disposed at the recovered water tank 13, or may be disposed anywhere as long as it is disposed at a water passage of the water related to the operation of the fuel cell.

Moreover, the fuel cell system includes an inverter 42 which converts DC electric power, generated by the fuel cell 3, into AC electric power and outputs the AC electric power.

Figure 2:
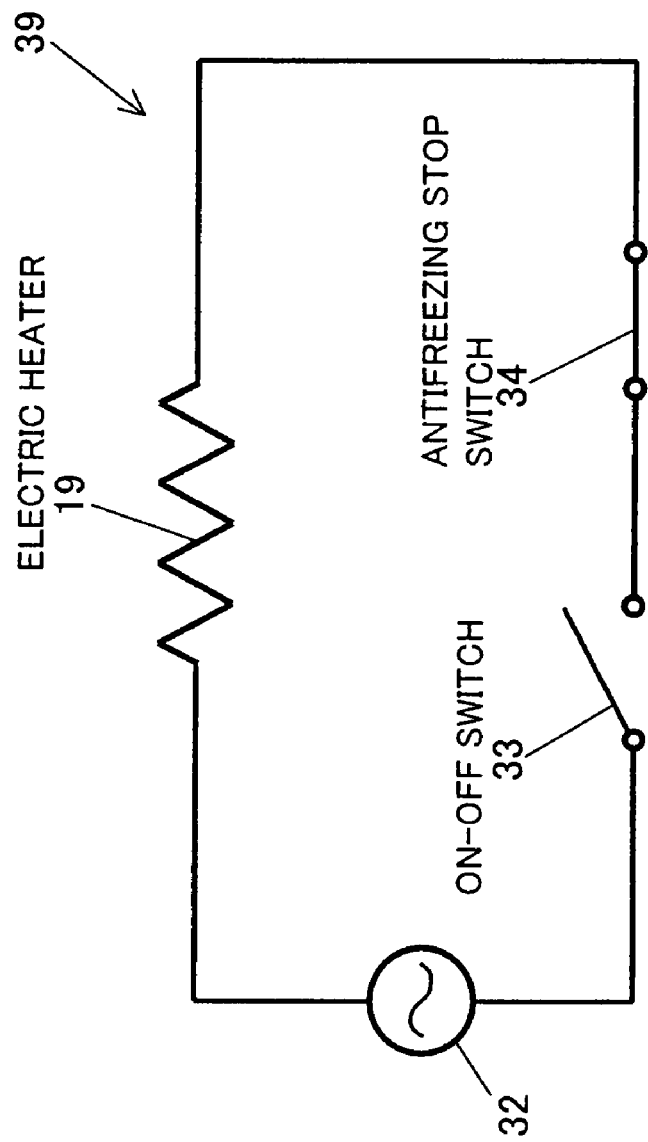
FIG. 2 is a circuit diagram showing the configuration of an antifreezing circuit.

Next, an antifreezing circuit 39 (a drive circuit of the electric heater 19) which characterizes the present invention will be explained. FIG. 2 is a circuit diagram showing the configuration of the antifreezing circuit.

As shown in FIG. 2, the antifreezing circuit 39 is configured such that the electric heater 19, an on-off switch 33, and an antifreezing stop switch 34 are connected in series to a power supply 32. Herein, the power supply 32 is constituted by a commercial electric power network which interconnects the fuel cell 3. The present embodiment may be configured such that while the fuel cell system is stopping, the commercial electric power network is used as the power supply 32, and while the fuel cell system is carrying out the electric power generating operation, the fuel cell 3 is used as the power supply. In the antifreezing circuit 39, when both the on-off switch 33 and the antifreezing stop switch 34 are closed (turned on), the electric heater 19 is energized by the power supply 32 to generate heat. By this heat generation, each passage at which the electric heater 19 is disposed is heated. Thus, the water in the passage is prevented from freezing. When the on-off switch 33 is opened (turned off), the energization to the electric heater 19 stops. Thus, the operation of preventing the freezing stops. When the antifreezing stop switch 34 is opened, the energization to the electric heater 19 stops regardless of whether the on-off switch 33 is closed or opened. Thus, the operation of preventing the freezing is prohibited. The operations of the on-off switch 33 and the antifreezing stop switch 34 are controlled by a below-described controller 21. One example of the on-off switch 32 is a bimetal which mechanically and automatically connects without control of the controller 21 when a below-described temperature detector 20 detects a first threshold temperature or lower.

Next, a control system configuration will be explained.

The fuel cell system includes the controller 21. The controller 21 is constituted by a calculating unit, such as a microcomputer, and includes a calculating portion (not shown) formed by, for example, a CPU, and a storage portion (not shown) formed by, for example, an internal memory. The controller 21 further includes an input portion (not shown) used to input necessary data to the calculating portion and a display portion (not shown) which displays the necessary data. In the controller 21, the storage portion stores a predetermined program, and the calculating portion reads out and executes the program. Thus, the controller 21 carries out necessary control and data processing. Specifically, the controller 21 receives detection signals from various sensors disposed at necessary portions of the fuel cell system and suitably processes the signals, thereby controlling the operations of the entire fuel cell system. In the present specification and claims, the controller denotes not only a single controller but also a group of controllers. Therefore, the controller 21 does not have to be constituted by a single controller. The controller 21 may be constituted by a plurality of controllers distributed, and may be configured such that these controllers carry out necessary control in cooperation with one another.

As a part of the above-described various sensors, the fuel cell system includes the temperature detector 20 (water-related temperature detector), a first abnormality detector, and a second abnormality detector.

The temperature detector 20 is disposed at a place so as to be able to detect a temperature related to the temperature of the water in each water passage. In the present invention, the "temperature related to the temperature of the water in the water passage" denotes the temperature itself of the water in the water passage or the temperature correlated to the temperature of the water in the water passage. Therefore, as long as the temperature detector 20 is disposed at a place so as to be able to detect the temperature correlated to the temperature of the water in the water passage, it may be disposed anywhere, does not have to directly detect the temperature in the water passage, and may be disposed inside or outside the fuel cell system. Note that the freezing of the water in the water passage is essentially relates to the outside air temperature. Therefore, in a case where the temperature detector 20 is disposed at a place other than the water passage, it is desirable that the temperature detector 20 be disposed at a position so as to be able to detect the outside air temperature. In the present embodiment, the temperature detector 20 is disposed at a bottom plate of a casing which stores the fuel cell system.

Next, the first abnormality detector and the second abnormality detector will be explained in reference to FIGS. 1 and 3. FIG. 3 is a table showing a classification of abnormalities in the present invention.

In the present invention, the abnormalities associated with the stopping of the fuel cell system are defined so as to include first abnormalities and second abnormalities. That is, the abnormalities associated with the stopping of the fuel cell system may be defined so as to include abnormalities other than the first abnormalities and the second abnormalities. Such abnormalities are not essentially related to the present invention, and are suitably processed. Hereinafter, the first abnormalities and the second abnormalities will be explained. The first abnormality detector detects the first abnormalities, and the second abnormality detector detects the second abnormalities. The first abnormalities denote abnormalities including abnormalities related to the leakage of the combustible gas, and the second abnormalities denote abnormalities different from the first abnormalities. To be specific, in the present invention, the first abnormalities are defined as abnormalities including abnormalities which disturb the safety of the fuel cell system by activating the heater while these abnormalities are occurring, and the second abnormalities are defined as abnormalities which do not disturb the safety of the fuel cell system even by activating the heater while these abnormalities are occurring. In the present embodiment, defined as the first abnormalities are five abnormalities that are: "combustible gas concentration abnormality" which means that the concentration of the combustible gas is a threshold or higher, "discharged combustion gas CO concentration abnormality" which means that the concentration of the CO in the discharged combustion gas is a threshold or higher, "combustion fan abnormality" which means that the combustion fan 6 does not operate normally, "reformer temperature abnormality" which means that the temperature of the reformer is a threshold or higher, and "reformer pressure abnormality" which means that the pressure of the reformer is a threshold or higher. The reason why these abnormalities are defined as the first abnormalities is because: the "combustible gas concentration abnormality" means that the combustible gas leaks in the fuel cell system; the "discharged combustion gas CO concentration abnormality" means that the combustion of the burner 5 is unstable, and the discharged hydrogen gas or the raw material, which are combustion fuel, may leak from an outlet port of the discharged combustion gas; the "combustion fan abnormality" means that the combustion may not be carried out in the burner 5, and the discharged hydrogen gas or the raw material, which are the combustion fuel, may leak from the outlet port of the discharged combustion gas; the "reformer temperature abnormality" means that the reformer 2 may be damaged by an abnormally high temperature, and this may cause the leakage of the combustible gas (hydrogen or unreformed raw material) in the reformer 2; and the "reformer pressure abnormality" means that the reformer 2 may be damaged by an abnormally high pressure, and this may cause the leakage of the combustible gas (hydrogen or unreformed raw material) in the reformer 2. Note that these are just examples of the first abnormality, and a part of these may be defined as the first abnormality, or abnormalities other than these may be defined as the first abnormality.

Defined as the second abnormalities are five abnormalities that are: "flow rate controller abnormality" which is an abnormality of a flow rate controller (except for a combustion air supplying unit) which controls the flow rate of water or air related to the operation of the fuel cell system; "water temperature abnormality" which is an abnormality regarding the temperature of water related to the operation of the fuel cell 3; "water level abnormality" which is an abnormality regarding the water level of the water related to the operation of the fuel cell 3; "flow rate abnormality" which is an abnormality regarding the flow rate of fluid (except for the combustion air) related to the operation of the fuel cell 3; and "electric power output abnormality" which is an abnormality regarding an output of electric power generated in the fuel cell 3. Defined as the "water temperature abnormality" are "cooling water temperature abnormality" which means that the temperature of the cooling water is outside an allowable range (an upper limit or more or less than a lower limit) and "hot water temperature abnormality" which means that the temperature of the hot water is outside an allowable range. Defined as the "water level abnormality" are "recovered water tank water level abnormality" which means that the water level of the recovered water tank 13 is outside an allowable range (for example, a predetermined threshold or lower) and "cooling water tank water level abnormality" which means that the water level of the cooling water tank 9 is outside an allowable range (for example, a predetermined threshold or lower). Defined as the "flow rate abnormality" are "reforming water abnormality" which means that the water is not normally supplied from the recovered water tank 13 to the reformer 2, "stack air supply abnormality" which means that the air is not normally supplied from the air supplying unit 4 to the fuel cell 3, "hot water pump abnormality" which means that a hot water pump 35 does not normally operate, "cooling water pump abnormality" which means that the cooling water pump 7 does not normally operate, and "oxidation gas flow rate abnormality" which means that the flow rate of the air supplied from the oxidation gas passage 37 to the CO remover 36 is outside an allowable range (for example, a predetermined threshold or lower). Defined as the "electric power output abnormality" regarding the electric power generated by the fuel cell 3 are "stack voltage drop abnormality" which means that the voltage of the electric power generated by the fuel cell 3 lowers to a threshold or lower and "inverter abnormality" which means that the inverter 42 does not normally operate. Specific examples of the "flow rate controller abnormality" are not shown herein, but may be suitably defined. Note that these are just examples of the second abnormality, and a part of these may be defined as the second abnormality, or abnormalities other than these may be defined as the second abnormality.

Herein, disposed as the first abnormality detector are a combustible gas sensor 22, a CO sensor 23, a combustion fan abnormality detector 24, a reformer temperature detector 25, and a pressure detector 26.

The combustible gas sensor 22 has a function of detecting the leakage of the combustible gas in the fuel cell system, and is constituted by a sensor which detects the concentration of the combustible gas, such as a combustible raw material or a combustible hydrogen gas. In the present embodiment, the combustible gas sensor 22 is disposed at an upper portion in the casing of the fuel cell system since the combustible gas tends to stay at the upper portion in the casing.

The CO sensor 23 has a function of detecting the concentration of the CO contained in the combustion gas discharged from the burner 5, is constituted by a CO concentration sensor, and is disposed inside the discharged combustion gas passage 27.

The combustion fan abnormality detector 24 is disposed at the combustion fan 6, and has a function of detecting the abnormality of the operation of the combustion fan 6. In the present embodiment, the combustion fan abnormality detector 24 is configured to detect the abnormality of the speed of rotation of the combustion fan 6.

The reformer temperature detector 25 has a function of detecting the temperature inside the reformer 2, is constituted by a temperature sensor herein, and is disposed at the reformer 2 so as to be able to detect the temperature inside the reformer 2. The reformer pressure detector 26 has a function of detecting the pressure inside the reformer 2, is constituted by a pressure sensor herein, and is disposed at the reformer 2 so as to be able to detect the pressure inside the reformer 2.

Herein, the controller 21 determines whether or not physical values detected by the combustible gas sensor 22, the CO sensor 23, the reformer temperature detector 25, and the reformer pressure detector 26 are abnormal. However, each of the combustible gas sensor 22, the CO sensor 23, the reformer temperature detector 25, and the reformer pressure detector 26 may be configured to include a calculating unit, such as a microcomputer, and may determine by the calculating unit whether or not the physical value is abnormal.

The present embodiment may be configured such that a raw material flow rate detector which detects the flow rate of the raw material supplied from the raw material supplying passage 1 is included as the first abnormality detector, and the controller 21 determines that the abnormality has occurred when the flow rate detected by the raw material flow rate detector is a predetermined flow rate or more. Specifically, the controller 21 is configured to execute a below-described gas leakage check sequence by using the raw material flow rate detector. To be specific, when fuel cell system stops (in this case, stands by (normally stops)), an upstream end of the raw material supplying passage 1 is closed by a valve, not shown. In this state, in a case where a suitable gas pressure applying device (gas supplying device), not shown, is connected to the raw material supplying passage 1 to apply a gas pressure of 2 kPa to the raw material supplying passage 1, and the flow rate detected by the raw material flow rate detector is a threshold or more, the controller 21 determines that the abnormality has occurred. This is because in this case, it is assumed that the combustible gas, such as a material gas or a hydrogen-rich gas, leaks from each passage.

Herein, disposed as the second abnormality detector are a cooling water temperature detector 52, a hot water temperature detector 56, a recovered water level detector 53, a cooling water level detector 52, a reforming water supply abnormality detector 54, a stack air supply abnormality detector 58, a hot water pump abnormality detector 55, a cooling water pump abnormality detector 28, an oxidation gas flow rate abnormality detector 57, a stack voltage detector 43, and an inverter abnormality detector 44.

The cooling water temperature detector 55 is constituted by a temperature sensor, and is disposed at a place so as to be able to detect the temperature of the cooling water of the cooling water tank 9. The hot water temperature detector 55 is constituted by a temperature sensor, and herein, is disposed on an outer surface of the hot water tank 11. The recovered water level detector 53 is constituted by a water level sensor, and is disposed at the recovered water tank 13 so as to be able to detect the water level of the recovered water tank 13. The cooling water level detector 51 is constituted by a water level sensor, and is disposed at the cooling water tank 19 so as to be able to detect the water level of the cooling water tank 19. Herein, the controller 21 determines that the abnormality has occurred when the temperatures detected by the cooling water temperature detector 52 and the hot water temperature detector 56 are outside an allowable range (an upper limit or more or less than a lower limit), and determines that the water level abnormality has occurred when the water levels detected by the recovered water level detector 53 and the cooling water level detector 51 are outside an allowable range (for example, a predetermined threshold or lower). The reforming water pump abnormality detector 54 is disposed at the reforming water pump 16, and has a function of detecting the abnormality of the operation of the reforming water pump 16. In the present embodiment, the reforming water pump abnormality detector 54 includes a pressure detector disposed at the reformer 2, and is configured to determine that the abnormality has occurred when the pressure change caused due to the evaporation of the reforming water is a predetermined threshold or lower. The stack air supply abnormality detector 58 is disposed at the air supplying unit 4, and has a function of detecting the abnormality of the operation of the air supplying unit 4. In the present embodiment, the stack air supply abnormality detector 58 includes a flow meter which detects the flow rate of the air supplied from the air supplying unit 4 constituted by a blower, and is configured to determine that the abnormality has occurred when the flow rate of the air is outside an allowable range (for example, a predetermined threshold or lower). The hot water pump abnormality detector 55 is disposed at the hot water pump 35, and has a function of detecting the abnormality of the operation of the hot water pump 35. In the present embodiment, the hot water pump abnormality detector 55 is configured to detect the abnormality of the speed of rotation of the hot water pump 35. The cooling water pump abnormality detector 28 is disposed at the cooling water pump 7, and has a function of detecting the abnormality of the operation of the cooling water pump 7. In the present embodiment, the cooling water pump abnormality detector 28 is configured to detect the abnormality of the speed of rotation of the cooling water pump 7. The oxidation gas flow rate abnormality detector 57 is constituted by a flow meter disposed at the oxidation gas passage 37, and is configured to detect the flow rate of the air supplied through the oxidation gas passage 37 to the CO remover 36. Herein, the controller 21 determines that the temperature abnormality has occurred when the flow rate of the air detected by the oxidation gas flow rate abnormality detector 57 is outside an allowable range (for example, a predetermined threshold or lower). The stack voltage detector 43 is constituted by a voltmeter which is disposed between a pair of electric wires 41 extending from a pair of output terminals of the fuel cell 3 to the inverter 42, and detects the voltage of the electric power generated by the fuel cell 3. Herein, the controller 21 determines that a stack voltage abnormality has occurred when a voltage detected by stack voltage detection lowers to a threshold or lower. The inverter abnormality detector 44 is disposed at the inverter 42, and has a function of detecting the abnormality of the operation of the inverter 42. In the present embodiment, for example, the inverter abnormality detector 44 is configured to detect the output current abnormality (for example, a predetermined threshold or more) of the inverter 42.

Herein, as described above, the controller 21 determines whether or not physical values detected by the cooling water temperature detector 52, the hot water temperature detector 56, the recovered water level detector 53, the cooling water level detector 52, the oxidation gas flow rate abnormality detector 57, and the stack voltage detector 43 are abnormal. However, each of the cooling water temperature detector 52, the hot water temperature detector 56, the recovered water level detector 53, the cooling water level detector 52, the oxidation gas flow rate abnormality detector 57, and the stack voltage detector 43 may be configured to include a calculating unit, such as a microcomputer, and determine by the calculating unit whether or not the physical value detected by each of them is abnormal.

Next, the operation of the fuel cell system configured as above will be explained. The operation of the fuel cell system is carried out by the control of the controller 21.

First, a general operation of the fuel cell system will be briefly explained. The raw material containing an organic compound made of at least carbon and hydrogen is supplied from the raw material supplying passage 1 to the reformer 2. The raw material is heated by the burner 5 to cause the steam-reforming reaction with the steam generated from the water supplied from the reforming water passage 17, thereby generating the hydrogen-containing gas. The concentration of the CO in the hydrogen-containing gas is reduced to a predetermined concentration by the CO remover 36, and the hydrogen-containing gas is then supplied through the hydrogen supplying passage 29 to the fuel cell 3. The hydrogen in the hydrogen-containing gas and the oxygen in the air supplied from the air supplying unit 4 electrochemically react with each other to generate electric power. The discharged hydrogen gas unconsumed by the electric power generating reaction is supplied through the discharged hydrogen gas passage 30 to the burner 5, and is utilized to heat the reformer 2.

The water generated by the reaction in the fuel cell 3 is contained mainly in the discharged air discharged from the fuel cell 3 through the discharged air passage 38. Moisture in the discharged air is condensed by a condenser, not shown, and the condensed water flows through the recovered water passage 12 and is stored in the recovered water tank 13.

Moreover, moisture contained in the discharged combustion gas discharged from the burner 5 through the discharged combustion gas passage 9 is condensed by a condenser, not shown, and the condensed water flows through the recovered water passage 12 and is stored in the recovered water tank 13. Further, moisture in the discharged hydrogen gas in the discharged hydrogen gas passage 30 is removed by a condenser, not shown, in order to stabilize the combustion in the burner 5, and the condensed water flows through the recovered water passage 12 and is stored in the recovered water tank 13. The water stored in the recovered water tank 13 is supplied to the reformer 2 by the reforming water pump 16 and is changed into the steam, and the steam is utilized in the steam-reforming reaction. Also, the water stored in the recovered water tank 13 is supplied by the mutual circulating pump 14 through the mutual circulating passage 15 to the cooling water tank 9 and is utilized as the cooling water which cools down the fuel cell 3. By circulating the cooling water using the cooling water pump 7, the heat generated by the electric power generating reaction in the fuel cell 3 is transferred via the heat exchanger 31 in the cooling water passage 8 to the hot water flowing through the hot water passage 10. Thus, the heat is utilized for domestic hot water supply, heating, and the like.

Then, the controller 21 stops the operation of the fuel cell system when the abnormality is detected by the first abnormality detector or the second abnormality detector. Moreover, in a case where the fuel cell system normally stops, when a detected temperature T detected by the temperature detector 20 (water-related temperature detector) is not more than the first threshold temperature (0° C. herein), the controller 21 causes the electric heater 19 to operate in order to carry out an antifreezing operation, and when the detected temperature T is not less than the second threshold temperature (1.5° C. herein) which is higher than the first threshold temperature, the controller 21 does not cause the electric heater 19 to operate in order to stop the antifreezing operation. The first threshold temperature is preferably a temperature at which the water in the water passage may freeze, or a temperature which is close to (which is about several degrees centigrade higher than) the temperature at which the water in the water passage may freeze. For example, the first threshold temperature is set to a temperature in a range from 0° C. to 5° C. Moreover, in the antifreezing operation in the present embodiment, the controller 21 causes the electric heater 19 to operate, and at the same time causes the mutual circulating pump 14, the hot water pump 35, and the cooling water pump 7 to operate, thereby causing the water in the mutual circulating passage 15, the hot water passage 10, and the cooling water passage 8 to flow therethrough. However, this may be omitted for simplification. This antifreezing operation is the same as the antifreezing operation carried out in a case where the operation of the fuel cell system stops since the second abnormality detector detects the abnormality. This will be explained in detail below.

Figure 4:
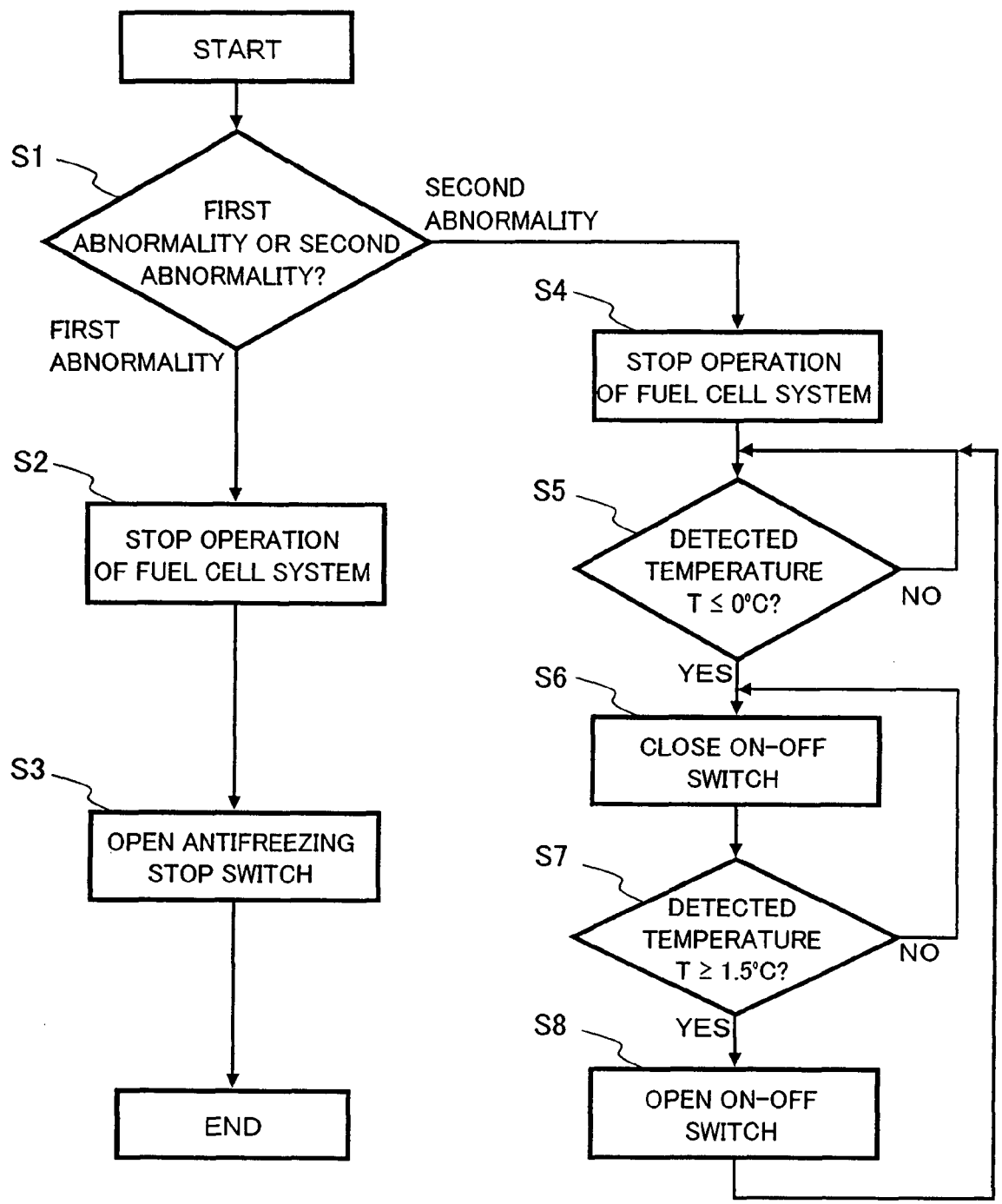
FIG. 4 is a flow chart showing steps of an abnormality processing program stored in a controller.
Figure 5:
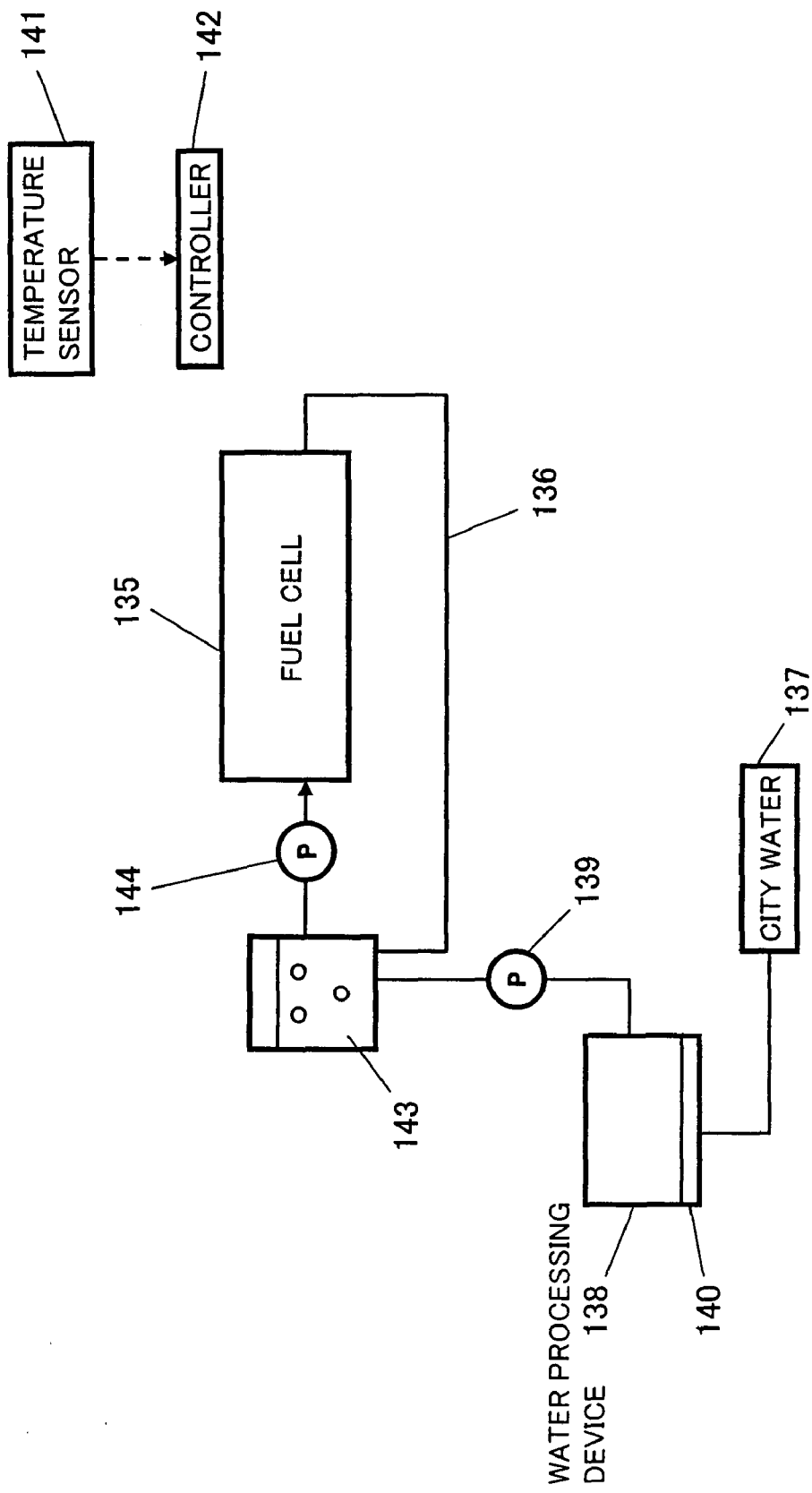
FIG. 5 is a schematic diagram showing the configuration of a conventional fuel cell system.

Next, the antifreezing operation, which characterizes the present invention and is carried out when the fuel cell system stops due to the abnormality, will be explained in reference to FIGS. 1 to 4. FIG. 4 is a flow chart showing steps of an abnormality processing program stored in the controller 21.

In a case where the physical value detected by at least one of the first abnormality detectors (the combustible gas sensor 22, the CO sensor 23, the combustion fan abnormality detector 24, the reformer temperature detector 25, and the pressure detector 26) is abnormal, the controller 21 does not carry out the antifreezing operation even when the detected temperature T detected by the temperature detector 20 is not more than the first threshold temperature (0° C.). On the other hand, in a case where the physical value detected by the second abnormality detector (the cooling water temperature detector 52, the hot water temperature detector 56, the recovered water level detector 53, the cooling water level detector 52, the reforming water supply abnormality detector 54, the stack air supply abnormality detector 58, the hot water pump abnormality detector 55, the cooling water pump abnormality detector 28, the oxidation gas flow rate abnormality detector 57, the stack voltage detector 43, and the inverter abnormality detector 44) is abnormal, the controller 21 carries out the antifreezing operation when the detected temperature T detected by the temperature detector 20 is not more than the first threshold temperature (0° C.).

Specifically, first, when the controller 21 detects the occurrence of the abnormality of the fuel cell system by the first abnormality detector or the second abnormality detector, it determines whether the abnormality is the first abnormality or the second abnormality based on the classification of the abnormality detector which has detected the abnormality (Step S1).

When the controller 21 determines that the abnormality is the first abnormality, it causes the fuel cell system to stop operating (Step S2). Then, the controller 21 opens the antifreezing stop switch 34 of the antifreezing circuit 39 (FIG. 3) (Step S3). Note that the antifreezing stop switch 34 is closed in an initial state (normal state). Then, this abnormality processing terminates. With this, the antifreezing circuit 39 does not operate, the antifreezing operation is prohibited, and the electric heater 19 is prohibited from being turned on. To be specific, the antifreezing operation is stopped when it is being carried out, and it is prohibited when it is not being carried out.

Specifically, in a case where the first abnormality is the abnormality detected by the combustible gas sensor 22, it is assumed that the combustible gas is leaking in the fuel cell system. However, since the electric heater 19 which may be the ignition source is prohibited from being turned on, fire, explosion, and the like caused by turning on the electric heater 19 are prevented to secure the safety of the fuel cell system.

Moreover, in a case where the first abnormality is the abnormality detected by the CO sensor 23, it is assumed that the combustion in the burner 5 is the incomplete combustion, and the combustible gas, such as the raw material or the discharged hydrogen gas, is leaking. However, since the electric heater 19 which may be the ignition source is prohibited from operating, fire and the like caused by turning on the electric heater 19 is prevented to secure the security of the fuel cell system.

Moreover, in a case where the first abnormality is the abnormality of the speed of rotation of the combustion fan 6 detected by the combustion fan abnormality detector 24, it is assumed that the combustion in the burner 5 is the incomplete combustion, and the combustible gas, such as the raw material or the discharged hydrogen gas, is leaking. However, since the electric heater 19 which may be the ignition source is prohibited from being turned on, fire and the like caused by turning on the electric heater 19 is prevented to secure the security of the fuel cell system.

Moreover, in a case where the first abnormality is the abnormality detected by the reformer temperature detector 25 or the pressure detector 26, it is assumed that the temperature inside the reformer 2 is an abnormally high temperature exceeding the heat resistance of the reformer 2, or the pressure inside the reformer 2 is an abnormally high pressure exceeding the pressure resistance of the reformer 2, and this may damage the reformer 2 to leak the combustible gas from the reformer 2. However, since the electric heater 19 which may be the ignition source is prohibited from being turned on, fire and the like caused by turning on the electric heater 19 is prevented to secure the security of the fuel cell system.

On the other hand, when the controller 21 determines in Step S1 that the abnormality is the second abnormality, it causes the fuel cell system to stop operating (Step S4) as with the case where the abnormality is the first abnormality. Next, the controller 21 determines whether or not the detected temperature T detected by the temperature detector 20 is not more than a first threshold (0° C.) which is a criterion of whether or not to carry out the antifreezing operation (Step S5). When the detected temperature T is more than the first threshold temperature, the controller 21 monitors whether or not the detected temperature T becomes the first threshold or lower. When the detected temperature T is not more than the first threshold temperature or when the detected temperature T becomes the first threshold temperature or lower, the controller 21 closes the on-off switch 33 of the antifreezing circuit 39 (Step S6). With this, the antifreezing operation is carried out, and the electric heater 19 operates. Moreover, the controller 21 causes the electric heater 19 to operate, and at the same time causes the mutual circulating pump 14, the hot water pump 35, and the cooling water pump 7 to operate, thereby causing the water in the mutual circulating passage 15, the hot water passage 10, and the cooling water passage 8 to flow therethrough. With this, the water in the mutual circulating passage 15, the hot water passage 10, and the cooling water passage 8 is prevented from freezing, and the damage of the fuel cell system caused due to the freezing of the water in the water passage is also prevented.

Next, the controller 21 determines whether or not the detected temperature T detected by the temperature detector 20 is not less than the second threshold temperature (1.5° C.) (Step S7). When the detected temperature T is less than the second threshold temperature, the controller 21 returns to Step S6. Then, until the detected temperature T reaches the second threshold temperature or higher, the on-off switch 33 remains closed, and the antifreezing operation is carried out. When the detected temperature T is not less than the second threshold temperature or when the detected temperature T becomes the second threshold temperature or higher, the controller 21 opens the on-off switch 33 (Step S8). With this, the antifreezing operation is stopped. After that, the controller 21 returns to Step S5, and the controller 21 monitors whether or not the detected temperature T becomes the first threshold or lower.

After Step S3 terminates, the controller 21 may again determine whether or not the first abnormality is detected by the first abnormality detector. When the first abnormality is not detected, to be specific, when it is determined that the first abnormality is resolved, the antifreezing operation may be carried out based on the detected temperature T detected by the temperature detector 20 to cause the electric heater 19 to operate. For example, in a case where the concentration of the combustible gas detected by the combustible gas sensor 22 as the first abnormality is not less than a threshold, the operation of the fuel cell system is stopped, and then the concentration of the combustible gas detected by the combustible gas sensor 22 becomes less than the threshold, the antifreezing operation may be carried out based on the detected temperature T detected by the temperature detector 20 to cause the electric heater 19 to operate.

It is preferable that the first and second threshold temperatures of the detected temperature be suitably set in accordance with where the temperature detector 20 is placed.

Moreover, in the fuel cell system of the present embodiment, the first abnormalities are defined as only the abnormalities related to the leakage of the combustible gas, and the second abnormalities are defined as the abnormalities other than the first abnormalities. This is the most preferable mode in light of the objects and effects of the present invention. However, the present invention is not limited to this. The first abnormalities may include the abnormalities different from the abnormalities related to the leakage of the combustible gas. For example, the objects and effects of the present invention are not spoiled even if the first abnormalities include a part of the "flow rate controller abnormality", the "water temperature abnormality", the "water level abnormality", the "flow rate abnormality", and the "electric power output abnormality" which are exemplified as the second abnormalities. Moreover, if the abnormality which disturbs the safety of the fuel cell system by turning on the heater during the occurrence of this abnormality is assumed other than the abnormality related to the leakage of the combustible gas, it may be defined as the first abnormality.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The fuel cell power generating system according to the present invention is useful as a fuel cell system which has a mechanism of preventing water from freezing and securing safety when the abnormality has occurred, and is for domestic use and the like.

The invention claimed is:

1. A method for operating a fuel cell system including a fuel cell configured to generate electric power using fuel, the method comprising steps of:
   detecting one or more first abnormalities including abnormalities related to leakage of a combustible gas in the fuel cell system;
   prohibiting an operation of an electric heater when at least one of the first abnormalities is detected, the electric heater being configured to heat a water passage in an anti freezing operation of said water passage in the fuel cell system;

detecting one or more second abnormalities in the fuel cell system, which are different from the first abnormalities; and executing the operation of said electric heater in the anti-freezing operation when at least one of the second abnormalities is detected.

2. The method according to claim 1, wherein the abnormalities related to the leakage of the combustible gas are abnormalities of a concentration of the combustible gas in the fuel cell system.

3. The method according to claim 1, wherein the abnormalities related to the leakage of the combustible gas are abnormalities of a concentration of CO in an exhaust gas discharged from a burner configured to heat a reformer configured to generate a hydrogen-containing gas as the fuel.

4. The method according to claim 1, wherein the first abnormalities are abnormalities of an oxidation gas supplying unit configured to supply an oxidation gas to a burner configured to heat a reformer configured to generate a hydrogen-containing gas as the fuel.

5. The method according to claim 1, wherein the first abnormalities are abnormalities of a temperature of a reformer configured to generate a hydrogen-containing gas as the fuel.

6. The method according to claim 1, wherein the first abnormalities are abnormalities of pressure inside a reformer configured to generate a hydrogen-containing gas as the fuel.

7. The method according to claim 1, wherein the second abnormalities include an abnormality of a flow rate controller except for a combustion air supplying unit, configured to control a flow rate of water or air related to an operation of the fuel cell system, an abnormality regarding a temperature of the water related to an operation of said fuel cell, an abnormality regarding a water level of the water related to the operation of said fuel cell, an abnormality regarding a flow rate of a fluid, except for combustion air, related to the operation of said fuel cell, or an abnormality regarding an output of the electric power generated by said fuel cell.

8. The method according to claim 7, wherein the abnormality regarding the flow rate of the fluid related to the operation of said fuel cell is an abnormality of a cooling water pump configured to cause cooling water to flow.

9. A method for operating a fuel cell system including a fuel cell configured to generate electric power using fuel, the method comprising steps of:

detecting a first abnormality including an abnormality which disturbs a safety of the fuel cell system if an electric heater is activated while the abnormality is occurring, the electric heater being configured to heat a water passage in the fuel cell system;

prohibiting an operation of the electric heater in an anti-freezing operation of the water passage in the fuel cell system when the first abnormality is detected;

detecting a second abnormality which does not disturb the safety of the fuel cell even if the heater is activated while the second abnormality is occurring; and executing the operation of the electric heater in the anti-freezing operation when the second abnormality is detected.

10. The method according to claim 9, wherein the abnormality included in the first abnormality is an abnormality of a concentration of the combustible gas in the fuel cell system.

11. The method according to claim 9, wherein the abnormality included in the first abnormality is an abnormality of a concentration of CO in an exhaust gas discharged from a burner configured to heat a reformer configured to generate a hydrogen-containing gas as the fuel.

12. The method according to claim 9, wherein the abnormality included in the first abnormality is an abnormality of an oxidation gas supplying unit configured to supply an oxidation gas to a burner configured to heat a reformer configured to generate a hydrogen-containing gas as the fuel.

13. The method according to claim 9, wherein the abnormality included in the first abnormality is an abnormality of a temperature of a reformer configured to generate a hydrogen-containing gas as the fuel.

14. The method according to claim 9, wherein the abnormality included in the first abnormality is an abnormality of pressure inside a reformer configured to generate a hydrogen-containing gas as the fuel.

15. The method according to claim 9, wherein the second abnormality is an abnormality of a flow rate controller, except for a combustion air supplying unit, configured to control a flow rate of water or air related to an operation of the fuel cell system, an abnormality regarding a temperature of the water related to an operation of said fuel cell, an abnormality regarding a water level of the water related to the operation of said fuel cell, an abnormality regarding a flow rate of a fluid, except for combustion air, related to the operation of said fuel cell, or an abnormality regarding an output of the electric power generated by said fuel cell.

16. The method according to claim 15, wherein the abnormality regarding the flow rate of the fluid related to the operation of said fuel cell is an abnormality of a cooling water pump configured to cause cooling water to flow.

* * * * *